(12) United States Patent
Couldwell et al.

(10) Patent No.: US 8,225,140 B2
(45) Date of Patent: Jul. 17, 2012

(54) METHOD AND SYSTEM FOR GRAPHICAL USER INTERFACE TESTING

(75) Inventors: Malcolm Alasdair Couldwell, Southampton (GB); Ian Gerald Craggs, Wltshire (GB); James Clive Stewart, Worcestershire (GB)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 11/962,194

(22) Filed: Dec. 21, 2007

(65) Prior Publication Data

US 2008/0155514 A1  Jun. 26, 2008

(30) Foreign Application Priority Data

Dec. 21, 2006 (GB) .................................. 0625577.2

(51) Int. Cl.
  *G06F 11/00* (2006.01)
(52) U.S. Cl. ........ 714/38.1; 717/125; 717/126; 717/135
(58) Field of Classification Search ........................ None
  See application file for complete search history.

(56) References Cited

U.S. PATENT DOCUMENTS

| | | | | |
|---|---|---|---|---|
| 5,436,637 A | * | 7/1995 | Gayraud et al. | 715/705 |
| 2002/0186248 A1 | * | 12/2002 | Ramanathan et al. | 345/780 |
| 2003/0095142 A1 | * | 5/2003 | Patrizio et al. | 345/744 |
| 2006/0085681 A1 | * | 4/2006 | Feldstein et al. | 714/25 |
| 2006/0195817 A1 | | 8/2006 | Moon | |

OTHER PUBLICATIONS

Qing, Xie, "Developing cost-effective model-based techniques for GUI testing," 28th Intl Conf on Software Eng Proceedings, XP002479740, pp. 997-1000 (New York, 2006).
Memon, A.M., "A Comprehensive Framework for Testing Graphical User Interfaces," University of Pittsburgh, XP007904230, pp. 1-126, 2001.

* cited by examiner

*Primary Examiner* — Scott Baderman
*Assistant Examiner* — Jason Bryan
(74) *Attorney, Agent, or Firm* — Cuenot, Forsythe & Kim, LLC

(57) ABSTRACT

A method and system are provided for testing a graphical user (GUI) (204). The method includes applying a test step (208, 222) to a GUI under test (204) and finding a control in the GUI under test (204) to which the test step is to be applied. A model (210) is built dynamically of representations of the contents of the GUI under test (204) as a new control is found. The method includes finding a collection of dependent controls and representing the collection of controls in the GUI model (210) as a generalised pattern of the controls. The method applies a test step to the model (210) simultaneously with the GUI under test (204) and compares the results of the test step from the GUI under test (204) and from the model (210). If a test step is applied to the model and it is determined that a representation of the control to which the test step is to be applied is not provided in the model (210), a building rule (212) is executed to add a representation of the control to the model (210).

17 Claims, 3 Drawing Sheets

METHOD AND SYSTEM FOR GRAPHICAL USER INTERFACE TESTING

BACKGROUND OF THE INVENTION

This invention relates to the field of graphical user interface (GUI) testing. In particular, it relates to GUI testing before the GUI being tested is complete.

Automated testing for GUIs is difficult because typically there is very little specification information available and GUIs are prone to repeated rapid change both during development and between software releases. Any automation of GUI based tests tends to be costly to develop and maintain, and thus marginal in cost effectiveness. Often the GUI development is gated by other components and interfaces so it is delivered late in the development cycle, limiting the testing time.

Automated GUI testing is currently done by recording steps taken by a user. These steps may include, for example, clicking links, buttons, etc. and entering data into entry fields, checkboxes, etc. Test tools record these steps, together with a record the individual elements (the "widgets") of the pages under test that were interacted with.

A GUI page has a hierarchy of widgets reflecting the nested HTML (hypertext mark-up language) tags encrypting the page content. Typically, a page will contain hundreds of elements, many of them invisible to the user, in a complex hierarchy with, for example, frames, forms, tables, documents, labels, labels containing one another, checkboxes, links, entry fields, etc.

The widget details are normally stored by a GUI test replay tool in a map which can be used to display the hierarchy of elements and to find them on the page when scripts are replayed. The map is built during the recording process and once recorded is not expected to change.

Pages under test are often generated using development tools and this makes them complex, often having many extra invisible layers of nested tables, forms, etc. It also makes them prone to change. A page may be regenerated every time the developer works on it and the order and content may change beyond recognition, as far as automation software is concerned, with each regeneration.

Whenever any pages change the test tool's map must be regenerated or maintained. Often the changes make the re-mapping very difficult, i.e. where a link is swapped for a button, where labels are swapped to be under their controls instead of visa versa, and where the invisible hierarchy of frames, forms, tables, etc. containing the controls adds or loses layers. If the map cannot be maintained, recorded test scripts fail because they do not find the required controls to click, enter data in, etc.

The fact that recording is based on recorded widgets limits testing to being based on recordings of actions. It is not possible to use test tools that create scripts using widgets without first interacting with the widgets to record them in a map. This effectively prevents testers from recording scripts until sample pages are available from development.

Maintaining large collections of test cases becomes very difficult in practice due to the problems of maintaining the mapping of widgets on the page. It is often quicker to re-record test scripts rather than to try to maintain them. Given hundreds or even thousands of test scripts, the effort involved in maintenance can become a serious limitation on GUI testing. Often GUI's tests are automated to a very limited extent because of the problems of maintenance.

It is an aim of the present invention to create and maintain a model of the contents of a GUI, without access to the GUI in question.

SUMMARY OF THE INVENTION

According to a first aspect of the present invention there is provided a method for GUI testing, comprising: applying a test step to a GUI under test; finding a control in the GUI under test to which the test step is to be applied; dynamically building a model of the contents of the GUI under test as a new control is found; and representing the controls of the GUI under test in the model.

The method may include finding a collection of dependent controls and representing the collection of controls in the model and representing a collection of controls as a generalised pattern of the controls in the model.

The method may include: applying the test step to the model of the contents of the GUI; and comparing the results of the test step from the GUI under test and from the model.

If the step of applying a test step to the model determines that a representation of the control to which the test step is to be applied is not provided in the model, the method may include executing a building rule to add a representation of the control to the model.

The method may further include providing representations in the model of controls found in the GUI under test and virtual controls which are not found in the GUI under test. The method may include building and maintaining contents data for the representations of the controls and the virtual controls in the model. Preferably, the method includes providing a visibility flag to distinguish the representations of the controls found in the GUI under test from the virtual controls.

A representation of a control in the model may be in the form of a class of control extended to include the properties of the individual control.

The method may include generating a plurality of test rules to emulate the behaviour of a real user of the GUI and the test rules may include randomly selected atomic actions which must be completed before a new rule is started and non-atomic actions which may be interrupted.

According to a second aspect of the present invention there is provided a system for GUI testing, comprising: a test engine for applying a test step to a GUI under test; means for dynamically building a model of the contents of the GUI under test as a new control is found in the GUI under test.

The test engine may apply the test step to the model and includes means for comparing the results of the test step from the GUI under test and from the model.

The means for dynamically building the model may include building rules which are executed if a test step determines that a representation of a control to which the test step is to be applied is not provided in the model.

The system may include means for generating a plurality of test rules to emulate the behaviour of a real user of the GUI, wherein the test rules include randomly selected atomic actions which must be completed before a new rule is started and non-atomic actions which may be interrupted.

According to a third aspect of the present invention there is provided a model of a GUI under test, comprising: representations of controls found in the GUI under test; and representations of virtual controls which are not found in the GUI under test but which provide structure to the model.

The model may include representing a collection of controls in the model as a generalised pattern of the controls in the model.

The representations of controls in the model may include a visibility flag to distinguish the representations of the controls found in the GUI under test from the virtual controls.

A representation of a control in the model may be in the form of a class of control extended to include the properties of the individual control.

According to a fourth aspect of the present invention there is provided a computer program product stored on a computer readable storage medium, comprising computer readable program code means for performing the steps of: applying a test step to a GUI under test; finding a control in the GUI under test to which the test step is to be applied; dynamically building a model of the contents of the GUI under test as a new control is found; and representing the controls of the GUI under test in the model.

BRIEF DESCRIPTION OF THE DRAWINGS

Embodiments of the present invention will now be described, by way of examples only, with reference to the accompanying drawings in which.

DESCRIPTION OF THE PREFERRED EMBODIMENTS

Figure 1:
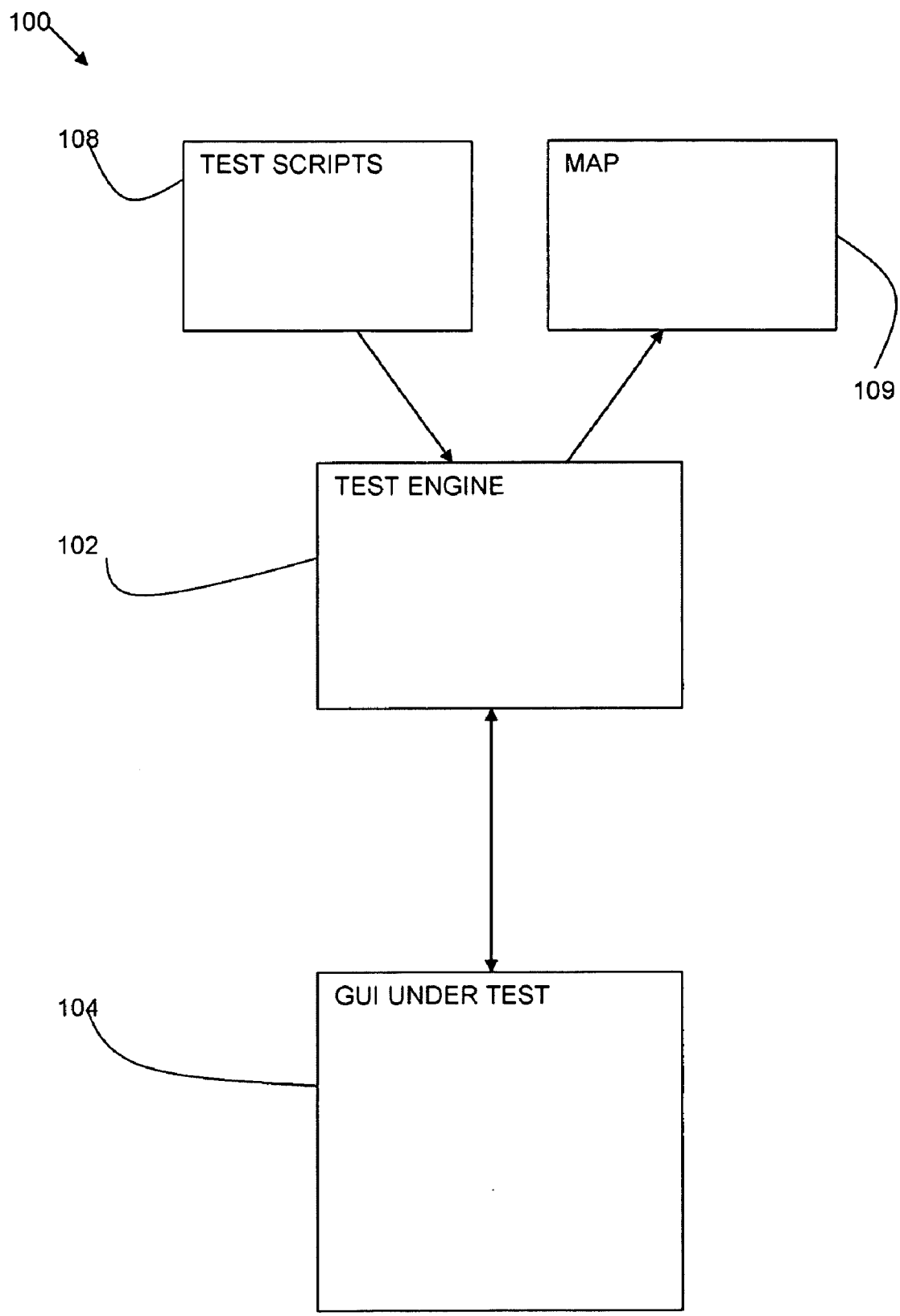
FIG. 1 is a block diagram of a GUI test system as known in the prior art.

Referring to FIG. 1, a conventional GUI testing system 100 is shown including a test engine 102 which runs tests on a GUI under test 104.

A GUI 104 usually has a plurality of pages, each page having a hierarchy of individual elements (referred to as "widgets") which can be interacted with by a user. For example, the hierarchy of widgets may include frames, forms, tables, documents, labels, nested labels, checkboxes, links, entry fields, etc.

In conventional testing, the test engine 102 runs test scripts 108 in the form of lists of GUI commands on the GUI under test 104. The GUI commands are automated commands representing steps which may be taken by a user interacting with the GUI 104. The test engine 102 records the steps taken and the widgets of the GUI pages that were interacted with.

In a conventional GUI testing system 100, a map 109 is generated and stored by the test engine 102. The map 109 displays the hierarchy of widgets in the GUI pages. The map 109 is used to find widgets on the GUI pages when test scripts 108 are run. The map 109 is designed to be a faithful record of the GUI pages' hierarchies of widgets.

Dynamic GUI Contents Model

A method for testing GUIs and a GUI testing system are provided in which a GUI page contents model (referred to herein as a "GUI model") is built dynamically by reading the contents of GUI pages. The GUI model is used as a basis both for checking and for running tests. No prior knowledge of the actual GUI is required before testing can start, as the GUI model is built by inspecting the provided GUI.

Figure 2:
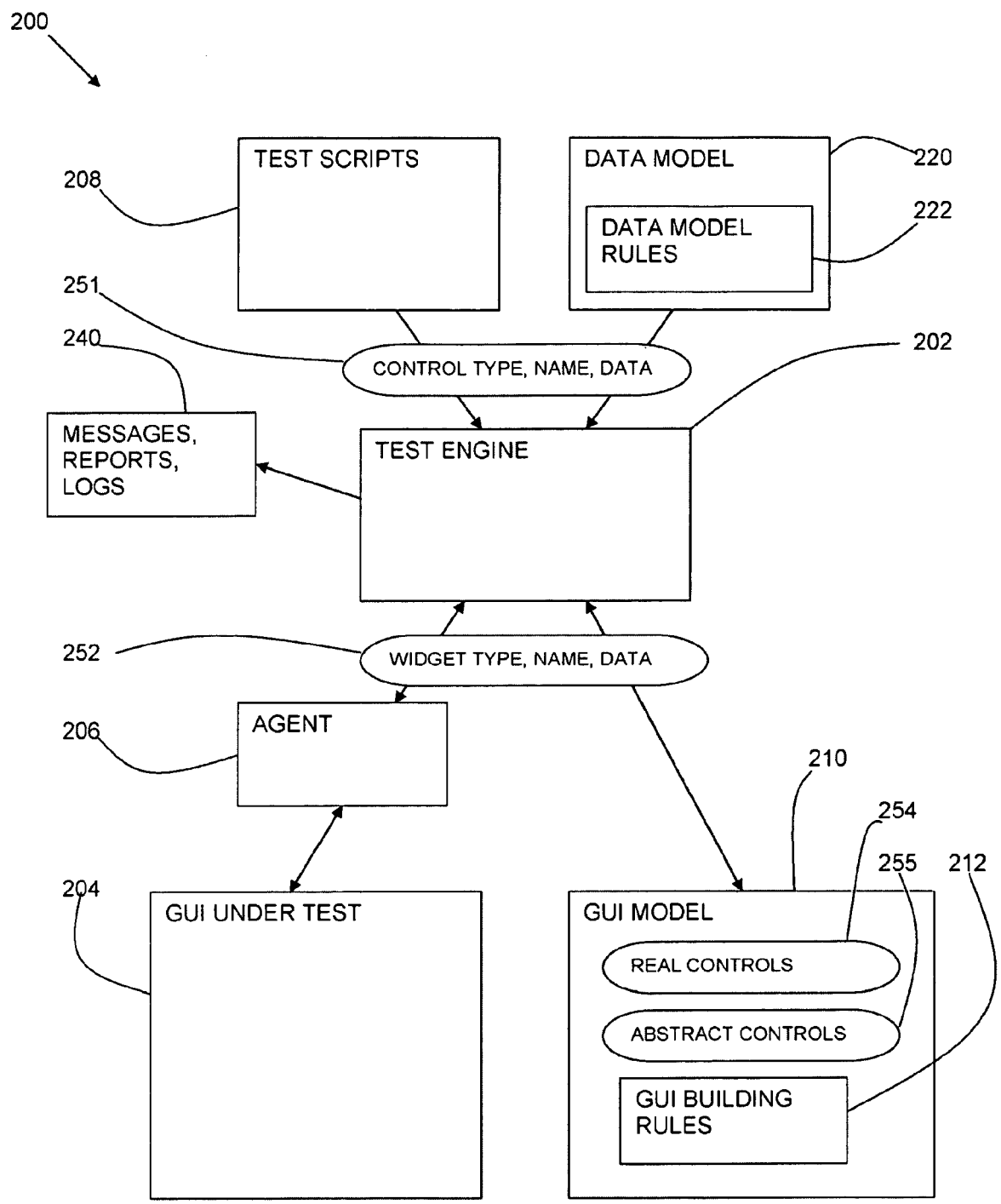
FIG. 2 is a block diagram of a GUI test system in accordance with the present invention.

Referring to FIG. 2, a test engine 202 is provided which runs tests on a GUI under test 204 via an agent 206. The test engine 202 also dynamically builds a GUI model 210 during the testing of the real GUI 204. The test engine 202 runs tests on the GUI model 210 as well as the real GUI 204.

The GUI model 210 includes GUI building rules 212 which are executed if a test is applied to a control which is not present in the GUI model 210. The GUI building rule 212 executes to add the missing control to the GUI model 210 such that at the next instance of a test being applied to the control, the GUI model 210 can be used.

The GUI model 210 is a model of the discovered contents of the pages of the GUI 204 under test. The GUI model 210 may consist, for example, of just a list of discovered controls.

The GUI model 210 may include internal model(s) or list(s) of data for both the real GUI 204 and derived or inferred controls. Thus, the GUI model 210 contains both the controls found on the page of the real GUI 204 and 'virtual' controls which are not actually part of the page but which are a useful representation of controls.

For example, the page might contain a label and an entry field widget. This would be modeled as a labeled entry field using the name from the label and the control which is the entry field widget. This labeled entry field is not a real element of the page but is useful for referring to the elements of the page being worked with.

As in conventional testing, the test engine 202 runs test scripts 208 in the form of lists of GUI commands to be carried out on the GUI under test 204. Additionally or alternatively, a model-based testing may be carried out.

A data model 220 of user interactions can be built manually in the form of an abstract model of the data and objects being handled by the GUI 204. This is separate from the GUI model 210. Model-based testing can use data model rules 222 which are random actions such as create, update, delete, etc. which result in expected outcomes in the data model 220. The rules 222 are sequences of instructions for test steps which are randomly selected during testing. The rules 222 are used to exercise scenarios and test aspects of the behaviour, as in traditional non-GUI model-based testing.

Thus, both the GUI model 210 and the data model 220 are in use during testing of a GUI 204. The GUI model 210 is used to unravel the page contents and to find controls on the page, and the data model 220 is used to decide what data is available and what can be done with the things it represents.

The test engine 202 generates messages, reports, logs, etc. of the tests run on the GUI 204 and the GUI model 210.

The test scripts 208 and data model rules 222 run commands in the form of controls 251 specifying the type, name and location of the controls plus associated data or actions to apply to the control. The GUI 204 and the GUI model 210 return widget instances 252. The GUI model 210 stores real controls 254 and abstract or virtual controls 255.

If the GUI 204 changes, the GUI model 210 can be regenerated in a few minutes, or dynamically updated during testing. This greatly reduces the lead time required to be able to test the GUI 204 and saves time and effort which would normally be spent automating tests. Tools using this technique can be applied to any GUI 204.

The GUI model 210 can be used to explore the real GUI and, as it is built, it is possible to log descriptions of various aspects of its contents. This allows data from the whole GUI 204 to be gathered automatically and inspected while testing continues.

The test scripts 208 or data model rules 222 test parts of the GUI operations available through the GUI model 210 and compare these with the real GUI 204 to report changes, unexpected or interesting features, or behaviour different from expectations. Randomly selected data model rules 222 may attempt operations on both the GUI 204 under test and the GUI model 210, and then compare the results. If the results differ, either the real GUI 204 or model GUI 210 may be behaving unexpectedly or may have changed. Whenever discrepancies, interesting features, or errors are detected, the test engine 202 may record the reasons and stop depending on the severity of the event.

This technique allows automated testing to start immediately a GUI 204 is made available for testing and, with some restrictions, testing can start before a GUI 204 is complete. If the GUI 204 is significantly changed, the GUI model 210 can be regenerated in a short time with very little effort.

The GUI model 210 may include some built-in behaviour such as HTML rules for actions on clicking links which can be checked for during testing. The GUI model 210 can be checked for particular aspects such as globalisation, accessibility, style, conformance with international and company standards, etc. Aspects of the GUI model 210 can be output for inspection, such as messages, tests, lists of control names, etc.

Building the GUI model 210 requires that the test engine 202 visits all panels of the GUI under test 204. It is difficult to ensure that the GUI model 210 is complete for a partly built GUI 204, where some controls may be broken. Repeatedly rebuilding the GUI model 204 may be time consuming for a large or rapidly changing GUI 204 in the early stages of development, when testing is most valuable.

By allowing building rules 212 designed to build the GUI model 210 to run alongside the test rules 222 which explore and test the GUI 204, the GUI model 210 can be built dynamically while it is under test. The test rules 222 operate if they find their required controls to act on. The building rules 212 operate whenever an empty panel or a new control is discovered. If a previously discovered panel is rediscovered the building rules 212 can check the panel under test for changes, update the GUI model 210 and report any changes.

When the testing starts the GUI model 210 is empty. The GUI model 210 is built dynamically during the testing as the controls and pages are discovered. Building rules 212 which populate the GUI model 210 in memory come into play, as they can be randomly selected at any time. The building rules 212 read information about the GUI panel currently displayed and add contents to the GUI model 210 to represent the panel contents. The test rules 222 which act on specific controls are not activated until the previously described building rules 212 have executed because they rely on the discovered controls to enable them to be selected.

During testing, as the GUI model 210 exercises links and controls, the building rules 212 may be randomly selected or triggered by discovery of panels which are not currently part of the GUI model 210. Thus, representations of new panels are added to the GUI model 210 as they are visited and known panels are periodically checked.

Figure 3:
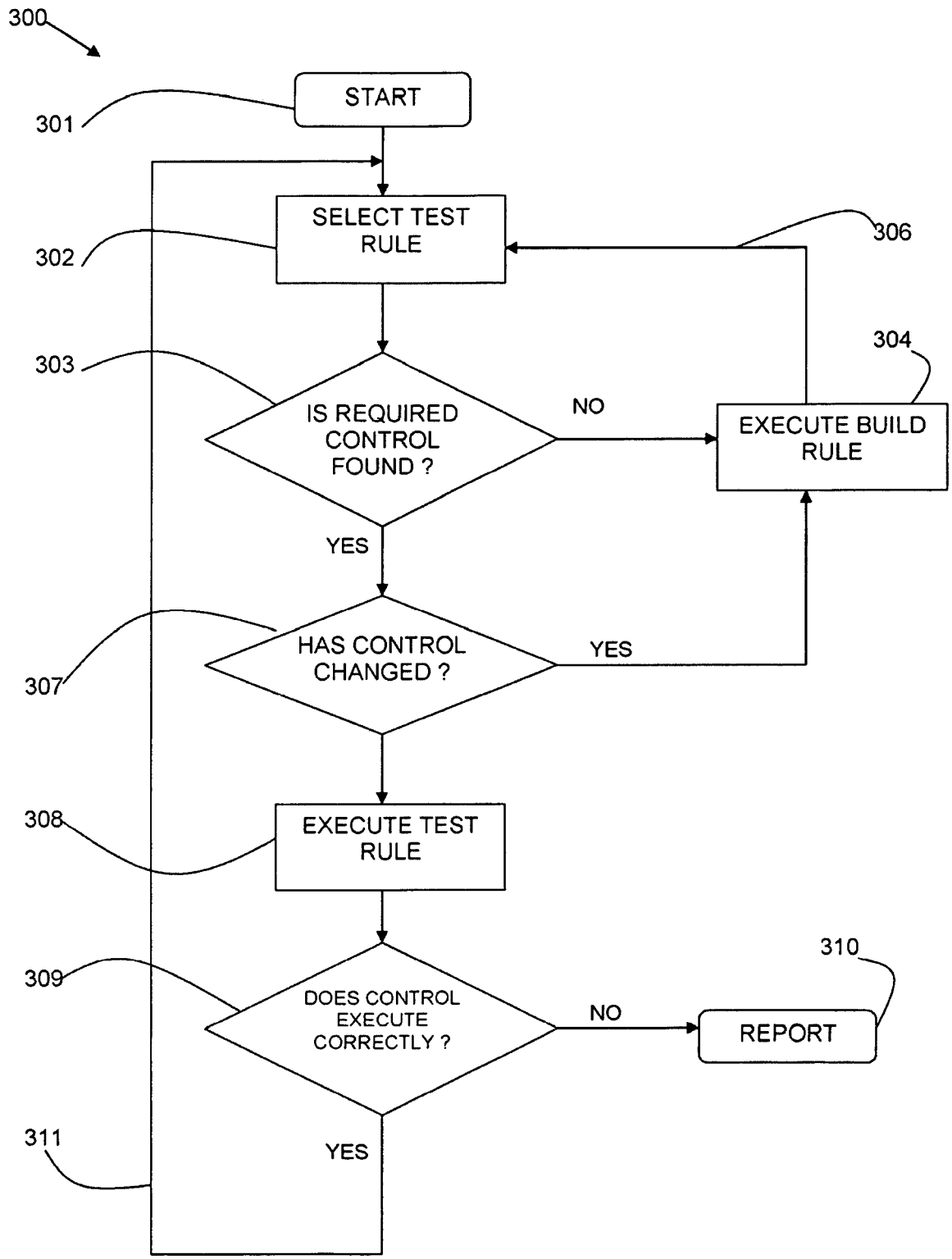
FIG. 3 is a flow diagram of a method in accordance with the present invention.

Referring to FIG. 3, a flow diagram 300 shows the method of executing test rules and building rules for a control in a GUI.

A test starts 301 and a randomly selected test rule is applied 302 to the GUI under test and the GUI model. It is determined 303 if the control on which the test rule is to be applied is found in the GUI model. If the control is not found, a building rule is executed 304 and the control is added in the GUI model. The method then loops 306 to re-try the test rule 302.

If the control is found, it is then determined 307 if the control has changed. If the control has changed, a building rule is executed 304 and the control is amended in the GUI model. The method then loops 306 to re-try the test rule 302.

If the control has not changed, the test rule is carried out 308 on the GUI and the GUI model. It is determined 309 if the control executes correctly. If not, a report is generated 310. If the control executes correctly, the method loops 311 to apply another test rule.

Collections of Controls in the GUI Model

The actions a normal user is aware of in a GUI generally involve working with collections of controls. These may be simply labels containing entry fields etc. or these may be more complex collections of several controls, as in a table row containing a checkbox and a hyperlink.

Conventional test tools normally record their maps in terms of the underlying widgets which may have names which make no sense to the user. They normally use combinations of properties from the entire page hierarchy to find the control during replay. This makes the detection of the control in question sensitive to small changes in other components of the page.

If a GUI model only operates in terms of the individual controls and fields it is not possible to detect or predict effects which may span many controls. If this is true, the model may fail when some controls appear or disappear as part of a collection (for example, when a table row is deleted), and the model does not expect this behaviour.

By automatically identifying nested collections of controls on a panel it is possible to make the GUI model accurately represent GUI actions for objects represented by control collections.

By identifying any repeated sequences and any specified patterns of object types in the hierarchy of controls on a GUI model, it is possible to recognise control collections. Collections typically span a single page although it is possible to recognise patterns across the entire GUI model.

Having recognised a pattern, that pattern may be stored as a template in a wildcard form, where specific properties such as labels and names are ignored and the minimum information required to recognise the controls is stored.

An advantage of using a pattern approach in a GUI model is that maintenance is far simpler, consisting of simply maintaining or adding patterns, which are far shorter and simpler than maps of the entire or partial page contents. In addition, patterns can be reused between builds, releases and projects. For example, the pattern for a labeled entry field can be applied to entry fields on many different GUI pages.

The patterns or collections of controls should be dynamically detected while tests run. Once a sufficient collection of patterns has been built up, tests have a good chance of continuing to run despite changes to the GUI under test. Any patterns that are not detected in the pages under test cause no problems and similarly for patterns which are detected but are not used in testing.

The patterns can be built up in a hierarchy of more abstract levels. Thus a complete page might be recognized as representing a data entry page to create a new record if it contains entry fields etc. and a button called 'Add'. In another example, a page might be recognized as a navigation frame because it contains 'twists' (icons to expand or collapse lists of links) and links. Once working at this level of abstraction, general purpose GUI models can be written and test scripts may be applied to a large number of pages or products.

It can be useful to print or display the 'collection-controls' alongside the raw widgets so that the user can debug scripts which fail. It is also useful to use only the 'collection-controls' for comparing page contents because they are more protected against change.

Visibility Flags

The GUI model needs to contain both 'real' controls which actually exist directly on the page and 'derived' controls (table rows, labeled entry fields, etc) which do not actually occur on the page but are useful for the test scripts and data models rules to refer to. One way of achieving this is to add all controls to the GUI model but to mark the 'derived' controls to ensure it is possible to tell which controls to expect to find actually occurring on the page and which controls to use in preference to the 'real' ones when available.

When testing a GUI only a small subset of the controls are visible at any one time. It is important that the GUI model always returns the same set of controls as are currently visible on the GUI under test so the model rules can decide which controls are available to act on and that the GUI model can be used to detect changes in the GUI under test. Tracking this information can be difficult because there may be a large number of controls and their state continually changes during testing.

By using a flag for each control in the model, typically in each software object representing a control, it is possible to record and indicate whether the widget should be visible.

The GUI model only returns controls where the 'visible' flag is currently set when requested to produce the set of controls that are currently expected to be visible.

Each control in the real GUI is represented by software in the GUI model containing a flag representing the controls 'visibility'. Setting the flags of all widgets contained in a GUI model's page contents allows the page to be rendered 'visible' or 'invisible' as happens during navigation using links, etc. Operations using hyperlinks, buttons, etc., set flags for the relevant collections of controls in the same way that the real controls make other elements of the GUI visible or invisible, i.e. clicking a link might make the contents of the current page invisible and the contents of a different page visible.

When test actions request visible controls from the GUI model only those with a flag set to represent 'visible' are returned. In this way, the GUI model always returns the same subset of its total content as the real GUI.

Widget Classes

When building a model of a GUI, many of the features of the controls being modelled are identical. To create a GUI model can require a large program and can be prone to errors. To minimise the software required to describe the controls, a general purpose widget type can be defined and then extended to include the properties of the individual control types.

A template or class of widget with the general properties of GUI controls is created. This is then extended to add the specifics of an individual control type. An example would be a widget class containing a name, visibility flag, permissions, a 'click' method, etc. Specific controls would have these properties plus some control specific behaviour such as the loading of pages by hyperlinks, or the entering of data into entry fields.

Thus controls can be modelled using the minimum of coding. This minimises the problems of creating a GUI model and subsequent maintenance of the GUI model.

Data Model Test Rules

Automated testing traditionally visits the same sequences of actions and data every time it is run. For most forms of testing, particularly GUI testing, the problems that the tests wish to discover are related to sequences of actions and variations of data. These problems are typically not discovered by re-running traditional recorded GUI tests. The performance of data driven automated tests is only slightly better. The costs versus benefit of these types of testing are marginal because of the limited effectiveness.

Ideally, a test tool should produce behaviour similar to a large number of users, i.e. detect sequence, data, and state related problems. By using a mixture of randomly selected rules, some taking random atomic actions (i.e. clicking links, buttons etc.) and some executing scenarios (i.e. a publish or delete operation) the testing can emulate the behaviour of real users. By combining this with randomly generated data the testing can be similar to the action of real users.

The data model test rules consist of some that produce atomic actions and some that produce sequences representing particular scenarios. The sequences can be built up from lists of atomic actions. During operation the data model randomly selects rules.

The rules for scenarios may be either 'atomic', i.e. must be completed before a new rule is run or 'non-atomic' i.e. able to be interrupted at various points in the sequence. The atomic approach is useful to ensure that specific or long scenarios are completed. The interruptible scenarios can produce more realistic behaviour as users may typically click a wrong button or decide to cancel a part completed operation.

The selection of the rules relating to individual controls is made to depend on the availability of the control. Thus a rule to click an 'apply' button would not be selected until a panel containing an apply button surfaced on the GUI.

For sequences of rules, there are three methods for selecting the rule:

a) If all the controls required by the rule are currently 'surfaced' i.e. visible on the current panel. This is only useful for sequences which do not navigate to new panels or create new content on the tested panel.

b) By checking before each step in the sequence for the required control to act on. This is dynamic i.e. it can continue a sequence of steps across multiple panels of a GUI and can even await the appearance of the next control in the sequence which might be discovered or surfaced by other rules or actions.

c) By pre-testing the operation within the model to determine if the sequence can be completed in the real GUI. This is more useful for test sequences that span several panels and only applies when the GUI model is at least partially complete.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer implementable method for graphical user interface (GUI) testing, comprising:

applying a test step to a GUI under test;

finding a control in the GUI under test to which the test step is to be applied;

dynamically building a model of the contents of the GUI under test as a new control is found;

representing the controls of the GUI under test in the model;

applying the test step to the model of the contents of the GUI; and comparing the results of the test step from the GUI under test and from the model.

2. A method as claimed in claim 1, including finding a collection of dependent controls and representing the collection of controls in the model.

3. A method as claimed in claim 2, including representing a collection of controls as a generalized pattern of the controls in the model.

4. A method as claimed in claim 1 wherein, if the step of applying a test step to the model determines that a representation of the control to which the test step is to be applied is not provided in the model, executing a building rule to add a representation of the control to the model.

5. A method as claimed in claim 1, including providing representations in the model of controls found in the GUI under test and virtual controls which are not found in the GUI under test.

6. A method as claimed in claim 5, including building and maintaining contents data for the representations of the controls and the virtual controls in the model.

7. A method as claimed in claim 5, including providing a visibility flag to distinguish the representations of the controls found in the GUI under test from the virtual controls.

8. A method as claimed in claim 1, wherein
a representation of a control in the model is in the form of a class of control extended to include the properties of the individual control.

9. A method as claimed in claim 1, including generating a plurality of test rules to emulate the behaviour of a real user of the GUI, wherein
the test rules include randomly selected atomic actions which must be completed before a new rule is started and non-atomic actions which may be interrupted.

10. A computer hardware system for graphical user interface (GUI) testing, comprising:
a processor, wherein the processor
includes a test engine configured to apply a test step to a GUI under test; and
is configured to dynamically build a model of the contents of the GUI under test upon a new control being found in the GUI under test, wherein
the test engine is configured to
apply the test step to the model and
compare the results of the test step from the GUI under test and from the model.

11. A system as claimed in claim 10, wherein
the processor includes building rules which are executed if a test step determines that a representation of a control to which the test step is to be applied is not provided in the model.

12. A system as claimed in claim 10, including means for generating a plurality of test rules to emulate the behaviour of a real user of the GUI, wherein
the test rules include randomly selected atomic actions which must be completed before a new rule is started and non-atomic actions which may be interrupted.

13. A computer program product comprising a computer readable storage medium having stored thereon computer readable program code, the computer readable program code, which when executed by a computer hardware system, causes the computer hardware system to perform:
applying a test step to a GUI under test;
finding a control in the GUI under test to which the test step is to be applied;
dynamically building a model of the contents of the GUI under test as a new control is found;
representing the controls of the GUI under test in the model;
applying the test step to the model of the contents of the GUI; and
comparing the results of the test step from the GUI under test and from the model.

14. The computer program product of claim 13, further comprising
computer readable program code for finding a collection of dependent controls and representing the collection of controls in the model.

15. The computer program product of claim 14, further comprising
computer readable program code for representing a collection of controls as a generalized pattern of the controls in the model.

16. The computer program product of claim 13, further comprising
computer readable program code for executing a building rule to add a representation of the control to the model when the program code for applying a test step to the model determines that a representation of the control to which the test step is to be applied is not provided in the model.

17. The computer program product of claim 13, further comprising
computer readable program code for providing representations in the model of controls found in the GUI under test and virtual controls which are not found in the GUI under test.

* * * * *